Aug. 7, 1962 O. F. ARTHUR 3,048,295
CONTAINER OF THE BOX TYPE
Filed Jan. 22, 1960 3 Sheets-Sheet 1
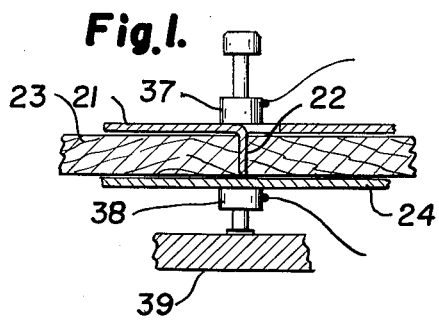
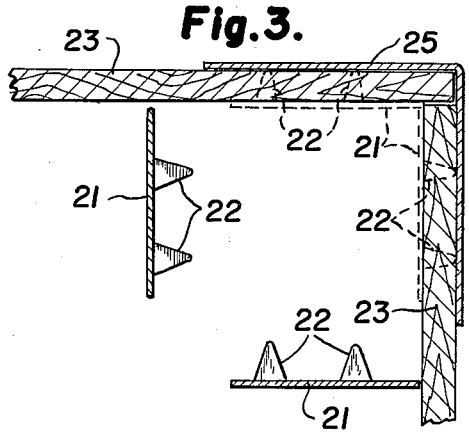
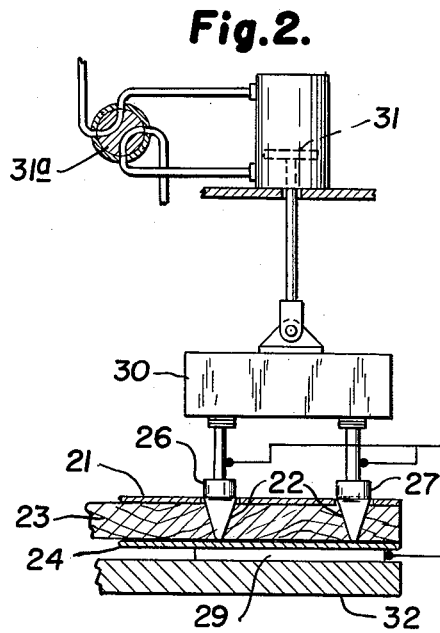
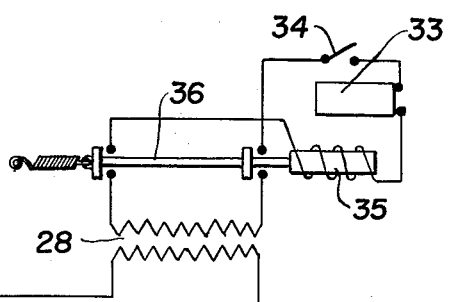
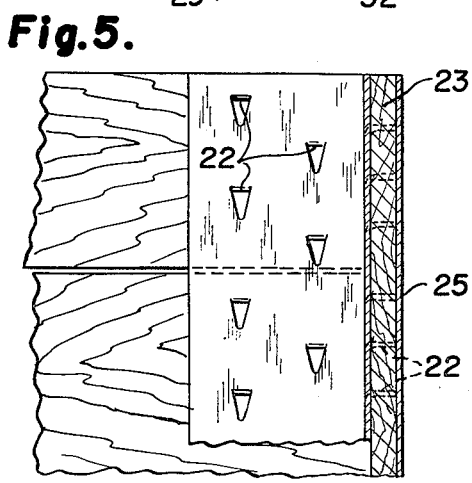
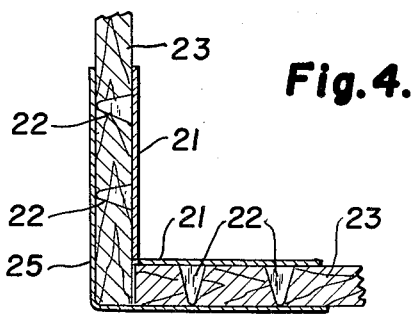
INVENTOR.
Oscar F. Arthur
BY Archworth Martin
his ATTORNEY Aug. 7, 1962 — O. F. ARTHUR — 3,048,295
CONTAINER OF THE BOX TYPE
Filed Jan. 22, 1960 — 3 Sheets-Sheet 2
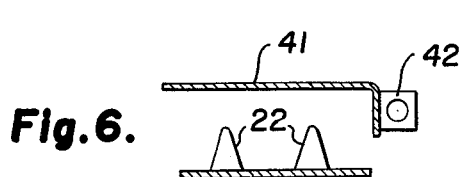
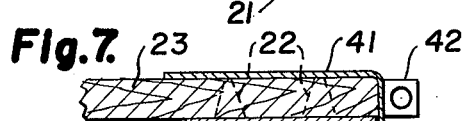
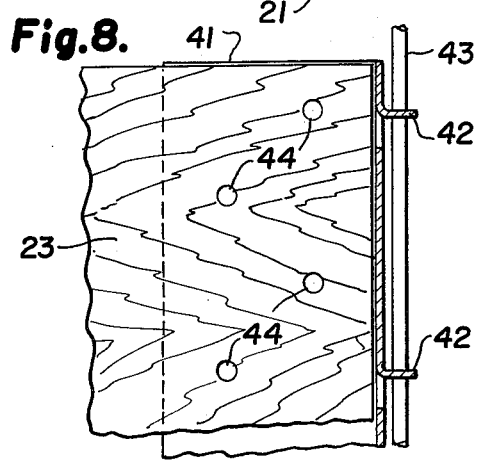
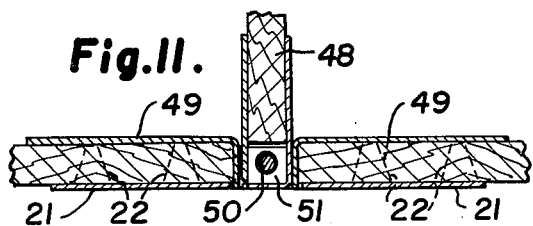
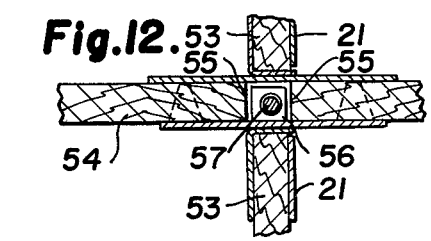
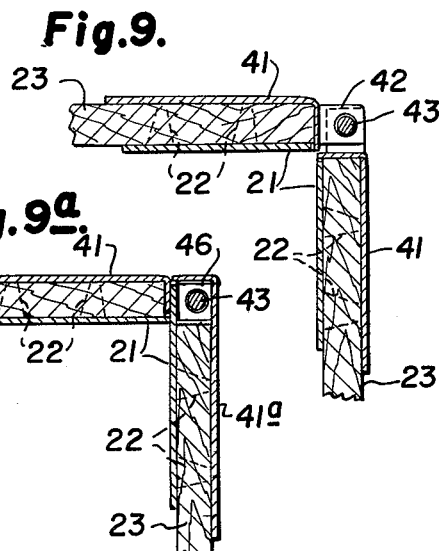
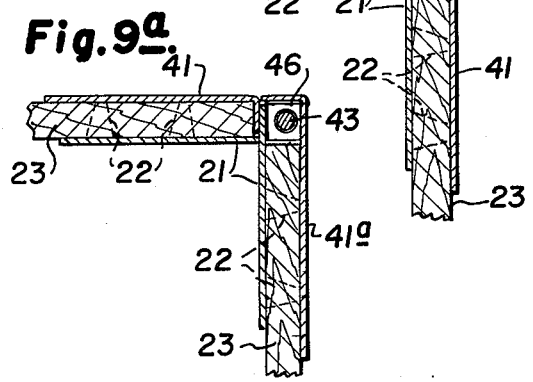
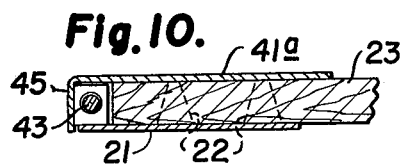
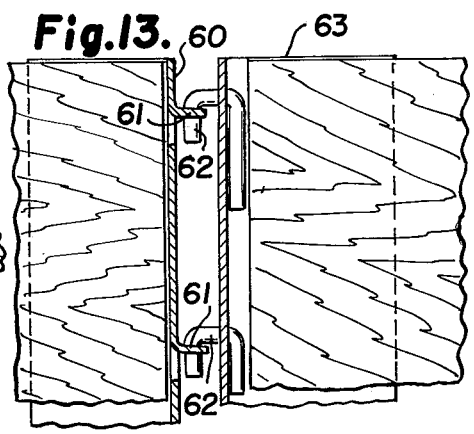
INVENTOR:
Oscar F. Arthur
BY Archworth Martin
his ATTORNEY Aug. 7, 1962 O. F. ARTHUR 3,048,295
CONTAINER OF THE BOX TYPE
Filed Jan. 22, 1960 3 Sheets-Sheet 3
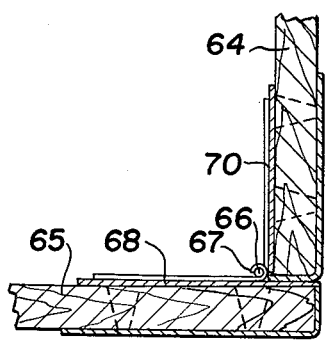
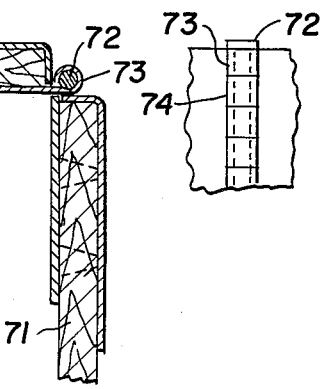
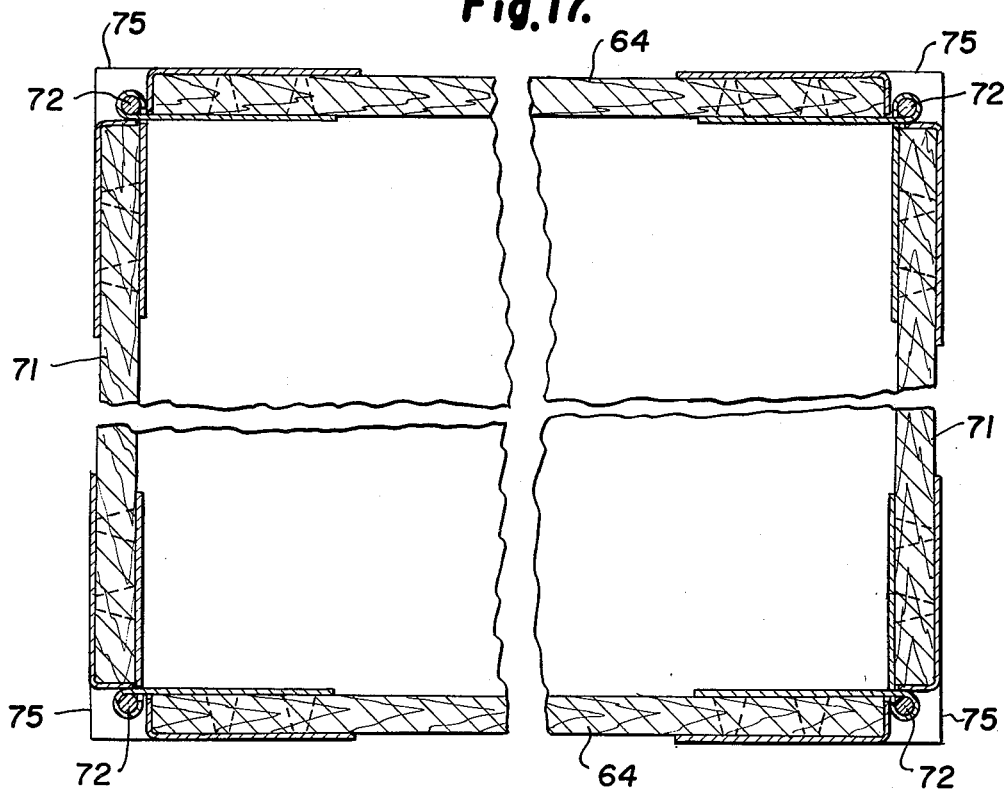
INVENTOR.
Oscar F. Arthur
BY Archworth Martin
his ATTORNEY

United States Patent Office 3,048,295
Patented Aug. 7, 1962

3,048,295
CONTAINER OF THE BOX TYPE
Oscar F. Arthur, Silver Spring, Md., assignor to Flow Products, Inc., Washington, D.C., a corporation of the District of Columbia
Filed Jan. 22, 1960, Ser. No. 4,106
7 Claims. (Cl. 217—12)

This invention is a continuation in part of certain of the disclosures contained in my application Ser. No. 816,495, filed May 28, 1959. It relates to containers of the box or crate type, and has for one of its objects, the provision of containers of the type referred to which may be conveniently made of light-weight material such as fiber board and thin wood strips or boards, and which nevertheless have great strength, when considering the weight and character of material used in the structure of the container.

Another object of my invention is to provide a container or crate of the character referred to which can readily be assembled and disassembled.

Still another object of my invention is to provide an improved manner and structure for reinforcing and strengthening relatively weak materials of sheet-like form.

Some of the forms which my invention may take and the method of practicing the same are shown in the accompanying drawings, wherein:

FIGURE 1 is a sectional view showing a manner in which facing plates of metal can be applied to fiber board or wood strips or sheets and welded together.

FIG. 2 shows a manner in which the members of FIGURE 1 may be arranged for welding together with a schematic arrangement for controlling a supply of electric current to the welding electrodes.

FIG. 3 is a fragmentary plan view showing certain of the boards and their stiffening plates, in partly assembled relation.

FIG. 4 is an assembly of the members of FIG. 3.

FIG. 5 is a partial inner elevational view of a portion of the structure of FIG. 3 partly completed.

FIG. 6 shows a modification of the stiffening plates of FIG. 3.

FIG. 7 is a sectional view of the plates of FIG. 6 in assembled relation.

FIG. 8 is a partial face view of the structure.

FIG. 9 is a sectional plan view of an assembly of elements formed according to FIGS. 6 to 8, for a container of the knockdown type.

FIG. 9a is a modification of FIG. 9.

FIG. 10 is a sectional plan view showing a modification of the structure of FIG. 7.

FIG. 11, in sectional plan view, shows still another arrangement whereby the members of FIGS. 7 and 10 may be assembled in a manner to form a container having partitions and side walls.

FIG. 12 shows a modification of the structure of FIG. 11, formed by using the connecting ears and bolts of FIG. 7 and FIG. 10.

FIG. 13 shows a modified form of the hinge connections of FIG. 8.

FIG. 14 is a sectional plan view of a container wherein two opposite side walls are foldable upon the bottom wall of the container.

FIG. 15 shows one manner in which vertical side walls of a container may be hingedly connected together.

FIG. 16 is a partial elevational view of the hinge joint of FIG. 15.

FIG. 17 is a plan view of a complete box, except for a lid.

As shown in FIGS. 1 to 5, for example, the stiffening or reinforcing plates heretofore referred to are preferably of metal, and certain of the plates such as 21 are punched to form triangularly shaped tangs or dowel members 22, bent at right angles to the plane of the plate. These plates are pressed against the body board or slat 23 which may be of fiber or wood, with such force that the tangs penetrate into and through the board 23, into abutting engagement with a metal plate 24 (FIGS. 1 and 2) or 25 (FIGS. 3 and 4).

As shown in FIG. 2, the parts 21, 23 and 24 are placed in superposed relation, with the tangs 22 extending through the board 23 and preferably flexed slightly against the upper face of the plate 24, whereby a circuit will be completed and electric current supplied through electrodes 26 and 27 against the upper side of the plate 21, from a source 28. The current will pass through the tangs 22, the lower plate 24 and an electrode 29 to complete a welding circuit. If the board 23 is of hard material, holes will be preliminarily drilled therethrough to receive the tangs 22. In any case, pressure will be applied to the upper electrodes by a presser head 30 actuated by a fluid pressure piston, suitably controlled by a 4-way valve 31a. Such pressure is imposed upon a suitably supported welding table 32, so that not only will the plates be pressed snugly against the faces of the board 23, but effective welding contact will be attained at the lower ends of the tangs 22, to the lower plate. The duration of welding current will automatically be limited by a timing device of suitably conventional form indicated at 33, past a switch 34, the said device including a solenoid 36 and a switch 36, operating in a well known manner to interrupt the welding circuit after a brief period following closure of the switch 34, which period may be but ⅕ of a second, or less, depending upon the character and gauge of the metal plates. Obviously various types of welding circuit controls can be utilized, as for instance, as disclosed in Patent to W. E. Reed, No. 1,932,119, October 24, 1933.

In FIGURE 1, I show a welding arrangement which may be somewhat similar to that of FIG. 2, but wherein the tangs 22 may be welded one-by-one through the use of a single manually or mechanically movable electrode 37, the other electrode 38 being supported by a base or table 39 and connected more directly to the source of electrical current than is the electrode 29.

It will be understood that the plates and the tangs may be connected together by the inductive welding method described in my said application, instead of employing a resistance welding method.

Referring now to FIGS. 6, 7 and 8, I show a side wall of a container of the knockdown type, and a manner in which the container walls may be hingedly connected. To this end, the plates 21 and their tangs 22 are welded to plates 41 at the corners of a box, the plates 41 being turned at an angle to cover the edge of the board 23. Ears 42 are pressed from the plates 41 and are perforated to receive a bolt or pin 43 at each corner of the box, which will extend also through similarly formed ears on another panel or side wall disposed at right angles thereto, as shown more clearly in FIG. 9. FIG. 8 also shows holes 44 that will receive the tangs 22 when the board 23 is of too hard a character to permit of pushing the tangs through the board to engage the plate 41. A bottom wall will be provided for the side walls, as shown in FIGS. 14 and 17.

In FIGS. 9a and 10, I show still another form of connecting member. In this instance, ears 46 are pressed into the angles of the plate 41a instead of exteriorly thereof as in FIGS. 6 and 8. When the parts are positioned with the plate 41 at right angles to the plate 41a and the ears 42 inserted in overlapped relation to the plates or ears 46, the bolt 43 will be inserted to hold the parts in assembled relation, as shown in FIG. 9a. It will be seen that while the structure of FIG. 9 has a pivotal connection at 43, the corner connection of FIG. 9a is approximately rigid.

Referring now to FIG. 11, I show an arrangement wherein a partition panel 48 is connected to two side walls or side wall panels 49, by a pin 50 that extends through ears of the panels 49, that correspond to the ears 42 of FIG. 7 and which extend through openings in the sides of the panel 48 into somewhat interleaved or overlapping relation to plates 51 on the partition or panel 48, these plates 51 corresponding to the plates 46 of FIG. 10. Upon removal of the pin 50, the parts can be disassembled or a panel 49 can be removed to reduce the length of the container. The pin will then be restored to interlocking position with the other panel 49 and the panel 48, when the extended capacity indicated in FIG. 11 is not required. The pin or bolt 50 can also extend through a bottom wall (not shown) as in FIG. 17.

In a somewhat similar manner, compartments may be formed as shown in FIG. 12, wherein panels or partition members 53, corresponding to the panel member of FIG. 7, will have their ears inserted through the face plates of a panel 54, into overlying relation with one another, the panel 54 having webs 55 formed therein, connected by a perforated plate 56 through which a pin 57 extends as well as extending through ears such as 42 on the panels 53.

FIG. 13 shows still another manner in which two panels or side walls may be connected. In this case, a plate 60 which corresponds to the plate 41 of FIGS. 7 and 8 has ears 61 struck therefrom for engagement by hooks 62 that are welded into a panel or side wall 63 and project therefrom. It will be understood that the panels of FIG. 13 will be constructed substantially the same as the laminated panels of the other figures.

Referring now to FIG. 14, I show a structure wherein vertical side walls 64 are hingedly connected to a bottom wall 65, these walls being of laminated structure, substantially as shown in FIG. 3, and they are hingedly connected by a pin 66 at the lower longitudinal corners of the container. The hinge pins 66 extend through knuckles 67 carried by the stiffening plates 68 of the panel 65 and through similarly formed knuckles 69 on the face plate 70 of the panel 64, the arrangement is similar to that shown in FIG. 16.

Referring now to FIG. 15, I show a manner in which the vertical walls of the structure of FIG. 14 may be connected. In this case, the wall 64 has vertical connection with a wall panel 71, through a bolt or pin 72 that extends through knuckles 73 formed on the facing plate of the panel 64 and knuckles 74 of the other panel 71. The four sides 64-71 of FIG. 15 will be held in assembled relation on a bottom wall or base 75, at its corners by the pins or bolts 72.

The side walls may be hinged to the bottom board, or the bottom simply held in place by the bolts. Again, the bolts 72 can also hold a lid or top board in place, in which case, the bolts would be placed with their heads below the bottom board and nuts applied to the upper ends of the bolts, for convenience in removing the lid.

I claim as my invention:

1. A corner structure for a container, that comprises adjoining walls disposed in angular relation to each other, facing sheets of metal respectively disposed against the inner and outer wall surfaces at the angle, certain of the facing sheets having tangs struck therefrom and extending through the said walls, and welded to the oppositely-disposed sheets, and hinge elements on the adjoining walls by which the walls are pivotally connected together.

2. A corner structure as recited in claim 1, wherein the hinge elements are disposed within the inner angle of the corner.

3. A container that comprises vertical wall members each having metal facing sheets disposed against the opposite surfaces of an intermediate sheet, certain of the facing sheets having tangs struck therefrom and extending through said intermediate sheet and welded to the opposite-disposed sheets, one facing sheet of each wall member having ears struck therefrom in horizontal planes in position to be placed in vertically aligned relation with ears similarly formed on an adjacent wall member, and a connecting pin extending through said ears.

4. A container that comprises a plurality of vertical walls arranged in end-to-end relationship at angles with respect to each other to form an enclosure, facing sheets of metal disposed adjacent the inner and outer surfaces of said walls at the ends thereof, certain of the facing sheets having tangs struck therefrom and extending through the walls and welded to the oppositely-disposed sheets, and hinge elements on adjoining walls by which the walls are pivotally connected together.

5. A container as recited in claim 4, wherein one of the facing sheets of metal at the ends of said walls is bent at right angles to cover its associated vertical edge of the wall.

6. A container that comprises a plurality of vertical walls arranged in end-to-end relationship at angles with respect to each other to form an enclosure, facing sheets of metal disposed adjacent the inner and outer surfaces of said walls at the opposite ends thereof, a vertical edge portion of each outer sheet being bent at right angles and covering one of the vertical edges of its associated wall, certain of the facing sheets having tangs struck therefrom and extending through the walls and welded to the oppositely-disposed sheets, ears struck to horizontal planes from said vertical edge portions which cover the vertical edges of said walls, and hinge pins extending through the ears of adjacent edges and connecting the walls together at the corners of the container.

7. A container as recited in claim 6, wherein the vertical walls rest upon a bottom wall and the said hinge pins also connect the vertical walls to said bottom wall.

References Cited in the file of this patent

UNITED STATES PATENTS

| | | |
|---|---|---|
| 436,149 | Overgaard | Sept. 9, 1890 |
| 1,132,989 | Walker | Mar. 23, 1915 |
| 1,190,610 | Wallace | July 11, 1916 |
| 2,159,069 | Zalkind | May 23, 1939 |
| 2,274,765 | Zalkind | Mar. 3, 1942 |

FOREIGN PATENTS

| | | |
|---|---|---|
| 474,371 | France | Nov. 24, 1914 |
| 23,164 | Australia | Feb. 6, 1936 |
| 655,099 | Great Britain | July 11, 1951 |